United States Patent
Fujii

(10) Patent No.: US 8,123,418 B2
(45) Date of Patent: *Feb. 28, 2012

(54) IMAGING DEVICE

(75) Inventor: Shinichi Fujii, Osaka (JP)

(73) Assignee: Sony Corporation, Tokyo (JP)

( * ) Notice: Subject to any disclaimer, the term of this patent is extended or adjusted under 35 U.S.C. 154(b) by 282 days.

This patent is subject to a terminal disclaimer.

(21) Appl. No.: 12/240,203

(22) Filed: Sep. 29, 2008

(65) Prior Publication Data

US 2009/0110387 A1 Apr. 30, 2009

(30) Foreign Application Priority Data

Oct. 26, 2007 (JP) ................................ 2007-278646

(51) Int. Cl.
G03B 19/12 (2006.01)

(52) U.S. Cl. .......................................... 396/354; 396/51

(58) Field of Classification Search .................. 396/51, 396/354, 287, 296, 374; 348/341, 344, 333.08, 348/333.09; 386/358
See application file for complete search history.

(56) References Cited

U.S. PATENT DOCUMENTS

| | | | | |
|---|---|---|---|---|
| 4,142,788 | A * | 3/1979 | Matsumoto et al. | 396/129 |
| 5,138,354 | A * | 8/1992 | Okada et al. | 396/78 |
| 5,245,381 | A * | 9/1993 | Takagi et al. | 396/287 |
| 5,699,115 | A * | 12/1997 | Hiraki et al. | 348/333.13 |
| 5,732,301 | A * | 3/1998 | Toyoda et al. | 396/436 |
| 5,745,798 | A * | 4/1998 | Hirasawa | 396/51 |
| 5,790,234 | A * | 8/1998 | Matsuyama | 351/212 |
| 6,041,195 | A * | 3/2000 | Honda et al. | 396/429 |
| 6,112,033 | A * | 8/2000 | Yano et al. | 396/323 |
| 6,374,054 | B1 * | 4/2002 | Schinner | 396/282 |
| 6,538,697 | B1 * | 3/2003 | Honda et al. | 348/333.03 |
| 6,661,460 | B1 * | 12/2003 | Higuchi | 348/333.08 |
| 7,414,664 | B2 * | 8/2008 | Suda | 348/341 |
| 7,907,201 | B2 * | 3/2011 | Kojima et al. | 348/333.01 |
| 2002/0114015 | A1 * | 8/2002 | Fujii et al. | 358/302 |

(Continued)

FOREIGN PATENT DOCUMENTS

JP 2001-125173 5/2001

(Continued)

OTHER PUBLICATIONS

U.S. Appl. No. 12/210,589, filed Sep. 15, 2008, Fujii.
U.S. Appl. No. 12/210,560, filed Sep. 15, 2008, Fujii.

*Primary Examiner* — Clayton E LaBalle
*Assistant Examiner* — Warren K Fenwick
(74) *Attorney, Agent, or Firm* — Oblon, Spivak, McClelland, Maier & Neustadt, L.L.P.

(57) ABSTRACT

An imaging device includes an imaging unit; a display unit; an electronic finder unit that performs preview display before actual shooting based on image signals successively generated by the imaging unit; an optical finder unit having a finder window; an optical-path switching unit that performs switching between a first optical path through which light from a subject is guided to the finder window and a second optical path through which the light is guided to the imaging unit; an eye detecting unit that detects presence of an eye in a proximity of the finder window; a first control unit that performs a first control operation so that the optical-path switching unit selects the first optical path upon detection of an eye; and a second control unit that performs a second control operation so that the optical-path switching unit selects the second optical path upon non-detection of an eye.

6 Claims, 6 Drawing Sheets

U.S. PATENT DOCUMENTS

| | | | |
|---|---|---|---|
| 2005/0219401 A1* | 10/2005 | Oikawa | 348/345 |
| 2006/0263080 A1* | 11/2006 | Okumura | 396/374 |
| 2008/0159730 A1* | 7/2008 | Yagyu et al. | 396/354 |
| 2008/0170150 A1* | 7/2008 | Kojima et al. | 348/333.01 |
| 2009/0051784 A1* | 2/2009 | Oda | 348/229.1 |

FOREIGN PATENT DOCUMENTS

| | | |
|---|---|---|
| JP | 2001-222059 | 8/2001 |
| JP | 2003-319226 | 11/2003 |

* cited by examiner

IMAGING DEVICE

CROSS REFERENCES TO RELATED APPLICATIONS

The present invention contains subject matter related to Japanese Patent Application JP 2007-278646 filed in the Japanese Patent Office on Oct. 26, 2007, the entire contents of which are incorporated herein by reference.

BACKGROUND OF THE INVENTION

1. Field of the Invention

The present invention relates to an imaging device having an optical finder function and an electronic finder function.

2. Description of the Related Art

In a single-lens reflex digital camera, usually, an optical finder is used to check a subject. However, a single-lens reflex digital camera with an electronic finder function for displaying an image of a subject in a manner like a moving picture has been proposed (Japanese Unexamined Patent Application Publication No. 2001-222059).

In such a camera, a user who shoots a picture can perform a composition determining operation (framing) by selecting either an optical finder or an electronic finder.

SUMMARY OF THE INVENTION

Switching between the optical finder and the electronic finder is performed by a manual operation such as pressing an operation button provided on the camera. Thus, at a right timing for shooting, it is difficult for the user to switch to a desired finder immediately and to shoot a picture.

There exists a demand for an imaging device in which switching between an optical finder and an electronic finder can be readily performed.

According to an embodiment of the present invention, there is provided an imaging device including (a) an imaging unit configured to generate image signals representing an image of a subject in accordance with light coming from the subject through a shooting optical system; (b) a display unit; (c) electronic finder means for performing a preview display on the display unit before actual shooting on the basis of image signals successively generated by the imaging unit; (d) optical finder means having a finder window; (e) optical-path switching means for performing switching between a first optical path through which the light coming from the subject is guided to the finder window and a second optical path through which the light coming from the subject is guided to the imaging unit; (f) eye detecting means for detecting presence of an eye in a proximity of the finder window; (g) first control means for performing a first control operation so that the optical-path switching means selects the first optical path in a case where the eye detecting means has detected the presence of an eye in the proximity of the finder window, whereby the light coming from the subject is guided to the finder window; and (h) second control means for performing a second control operation so that the optical-path switching means selects the second optical path in a case where the eye detecting means has not detected the presence of an eye in the proximity of the finder window, whereby the preview display is performed.

According to the embodiment, in a case where the eye detecting means has detected the presence of an eye in the proximity of the finder window, the first control operation is executed so that the optical-path switching means selects the first optical path, whereby the light coming from the subject is guided to the finder window. On the other hand, in a case where the eye detecting means has not detected the presence of an eye in the proximity of the finder window, the second control operation is executed so that the optical-path switching means selects the second optical path, whereby the preview display is performed. Accordingly, it becomes readily possible to perform switching between the electronic finder and the optical finder.

DESCRIPTION OF THE PREFERRED EMBODIMENTS

External Configuration of an Imaging Device 1

Figure 1:
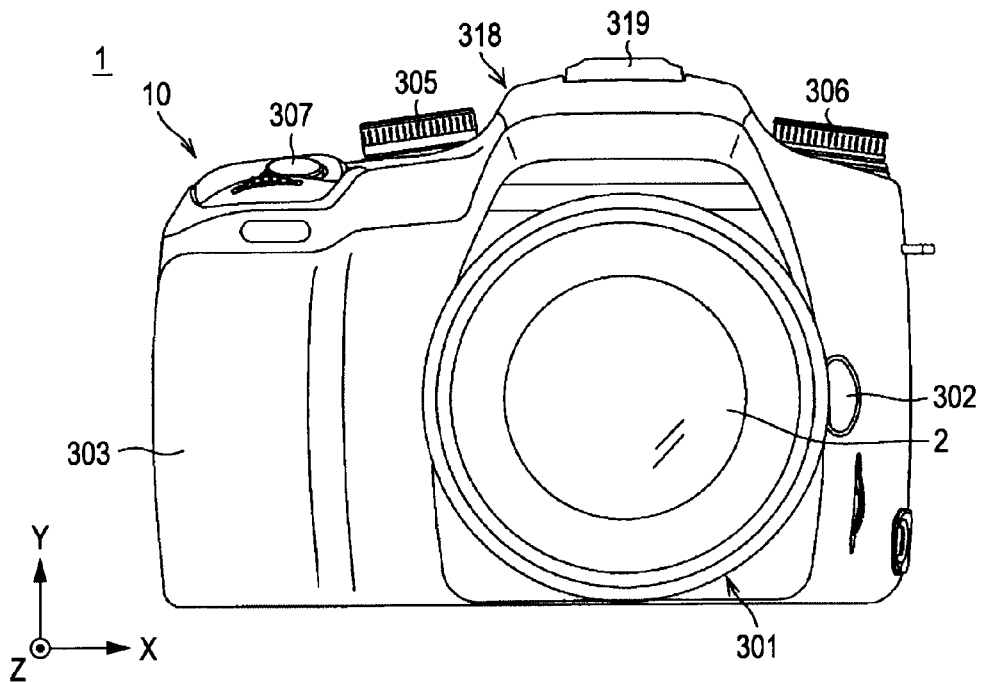
FIG. 1 is an illustration showing the external configuration of an imaging device according to an embodiment of the present invention.
Figure 2:
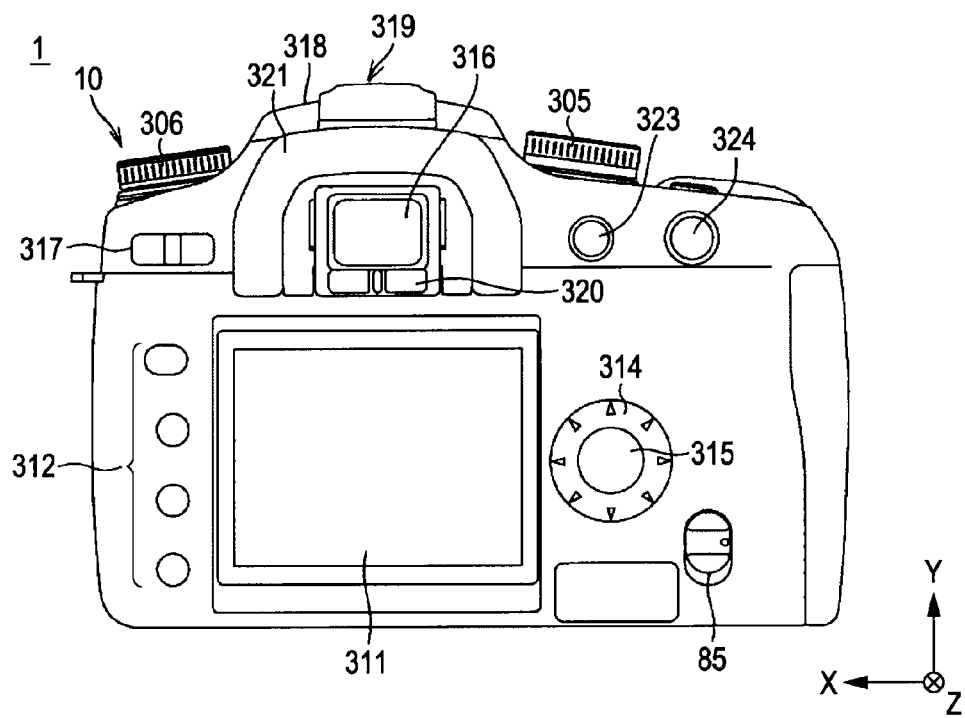
FIG. 2 is an illustration showing the external configuration of the imaging device.

FIGS. 1 and 2 are illustrations showing the external configuration of an imaging device 1 according to an embodiment of the present invention, where FIG. 1 shows a front view and FIG. 2 shows a rear view.

The imaging device 1 is configured as a single-lens reflex digital still camera. The imaging device 1 includes a camera body 10, and an exchange lens 2 as an imaging lens that can be mounted on or dismounted from the camera body 10.

More specifically, referring to FIG. 1, provided on the front side of the camera body 10 are a mounting part 301 where the exchange lens 2 is mounted, provided substantially at the center of the front side, a lens exchange button 302 provided on the right side of the mounting part 301, a grip part 303 that allows a user to hold the imaging device 1, a mode setting dial 305 provided in an upper left part on the front side, a control-value setting dial 306 provided in an upper right part on the front side, and a shutter button 307 provided on an upper surface of the grip part 303.

The exchange lens 2 functions as a lens window through which light from a subject (subject light) is captured, and also functions as a shooting optical system for guiding the light from the subject to the imaging element 101 provided inside the camera body 10.

Figure 5:
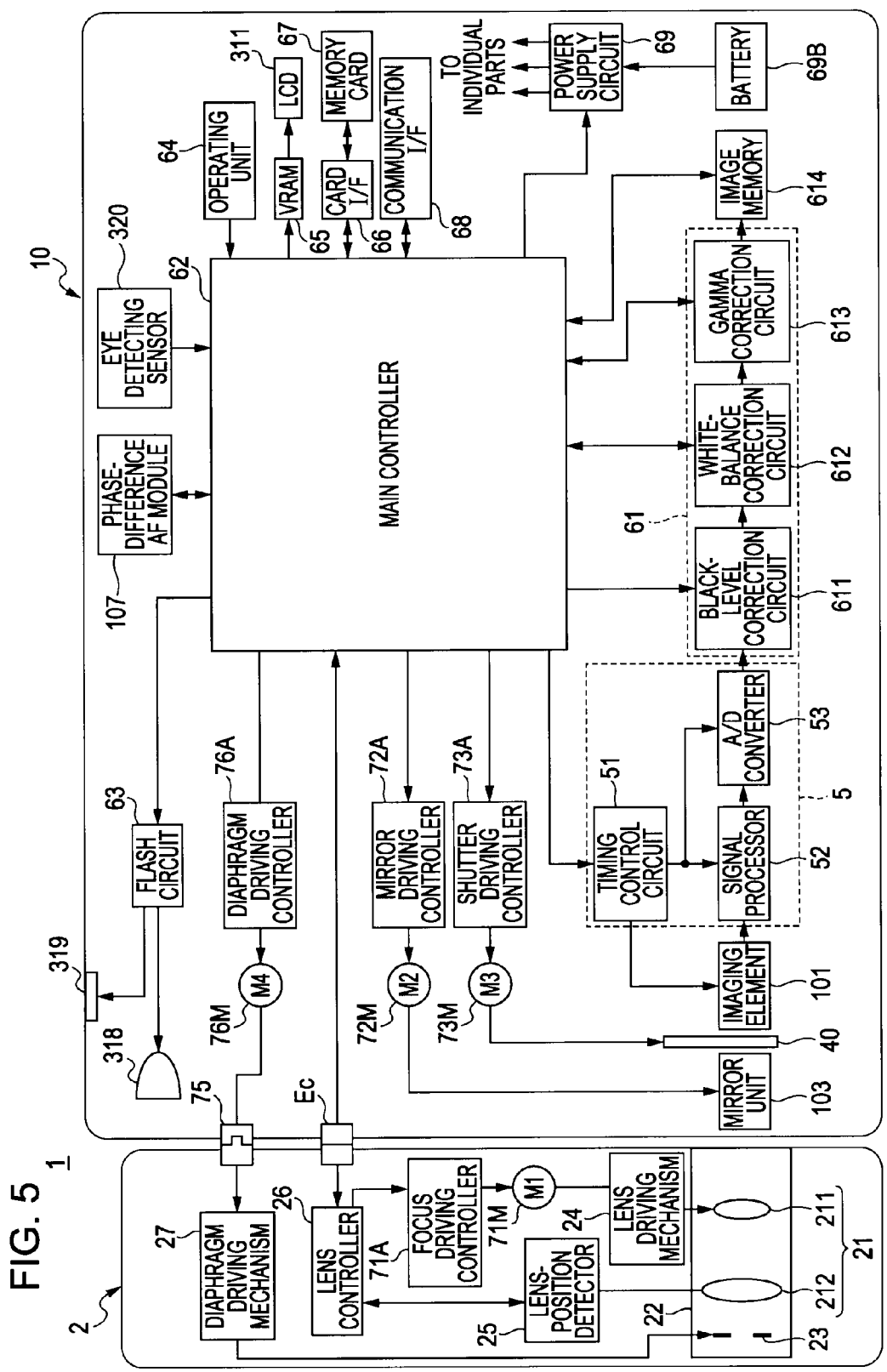
FIG. 5 is a block diagram showing the electrical configuration of the imaging device.

More specifically, the exchange lens 2 includes a lens set 21 including a plurality of lenses arrayed in series along an optical axis LT (see FIG. 5). The lens set 21 includes a focus lens 211 (see FIG. 5) for adjusting the focus, and a zoom lens 212 (see FIG. 5) for changing the magnification factor. The focus can be adjusted and the magnification factor can be changed by driving the focus lens 211 and the zoom lens 212 in the direction of the optical axis LT (see FIG. 3), respectively. Furthermore, at an appropriate part around the barrel of the exchange lens 2, an operation ring that can be rotated along the peripheral surface of the barrel is provided. The zoom lens 212 is moved in the direction of the optical axis LT in accordance with the direction and amount of rotation of the operation ring by a manual operation or an automatic operation, and a zoom factor (magnification factor for shooting) corresponding to the position after the movement is set.

In the mounting part 301, a connector Ec (see FIG. 5) for forming an electrical connection with the exchange lens 2 mounted, and a coupler 75 (see FIG. 5) for forming a mechanical coupling with the exchange lens 2 mounted are provided.

The lens exchange button 302 is pressed when dismounting the exchange lens 2 mounted on the mounting part 301.

The grip part 303 is a part that allows a user to hold the imaging device 1 when the user shoots a picture. For the purpose of enhanced fitting, the grip part 303 has an undulated surface in accordance with the shapes of fingers. Inside the grip part 303, a battery containing room and a card containing room (not shown) are provided. The battery containing room contains a battery 69B (see FIG. 5) as a power source for the imaging device 1, and the card containing room contains a memory card 67 (see FIG. 5) for recording image data of shot pictures thereon, in such a manner that the memory card 67 is removable. The grip part 303 may have a grip sensor for detecting whether the grip part 303 is held by a user.

The mode setting dial 305 and the control-value setting dial 306 are formed of substantially disk-shaped parts that can rotate in a plane substantially parallel to the upper surface of the camera body 10. The mode setting dial 305 is used to select one of various modes of the imaging device 1 (various shooting modes (person shooting mode, scenery shooting mode, full-auto shooting mode, etc.), reproducing mode for reproducing shot pictures, communication mode for data communication with an external device, and so forth). The control-value setting dial 306 is used to set control values for various functions of the imaging device 1.

The shutter button 307 is a press switch with which two states can be detected, namely, a "half-pressed state", in which the shutter button 307 is pressed to an intermediate position, and a "full-pressed state", in which the shutter button 307 is further pressed to a deeper position. In a shooting mode, when the shutter button 307 is half-pressed (S1), preparatory operations for shooting a still picture of a subject (such as setting of an exposure control value and focus detection) are performed. Furthermore, when the shutter button 307 is full-pressed (S2), a shooting operation (a series of operations for exposing an imaging element 101 (see FIG. 3), performing predetermined image processing on image signals acquired by the exposure, and recording the result on the memory card 67 or the like) is performed.

Referring next to FIG. 2, provided on the rear side of the camera body 10 are a liquid crystal display (LCD) 311 that functions as a display unit, a finder window 316 provided on the upper side of the LCD 311, an eye detecting sensor 320 provided on the lower side of the finder window 316, an eyecup surrounding the finder window 316, a main switch 317 provided on the left side of the finder window 316, an exposure correction button 323 and an auto exposure (AE) lock button 324 provided on the right side of the finder window 316, and a flash unit 318 and a connection terminal part 319 provided on the upper side of the finder window 316. Provided further on the rear side of the camera body 10 are setting buttons 312 provided on the left side of the LCD 311, a direction selecting key 314 provided on the right side of the LCD 311, a push button 315 provided at the center of the direction selecting key 314, and a display changeover switch 85 provided on the lower right side of the direction selecting key 314.

The LCD 311 has a color liquid crystal panel capable of displaying pictures. The LCD 311 displays a picture acquired by the imaging element 101 (see FIG. 3), reproduces and displays a picture that has been recorded, and so forth. Furthermore, the LCD 311 displays a screen for setting of functions or modes of the imaging device 1. Instead of the LCD 311, an organic EL display or a plasma display may be used.

The finder window (viewing window) 316 constitutes an optical view finder (OVF). To the finder window 316, light forming a subject image (subject light), coming through the exchange lens 2, is guided. The user can visually check the subject image actually shot by the imaging element 101 by looking into the finder window 316.

The eye detecting sensor 320 is a sensor that detects the presence or absence of an object in the proximity thereof. The eye detecting sensor 320 detects whether the user is using the optical finder, and outputs a signal corresponding to whether an eye of the user is detected in the proximity thereof.

The main switch 317 is implemented by a two-contact-point slide switch that can slide leftward and rightward. The imaging device 1 is powered on when the main switch 317 is set to the left side, and the imaging device 1 is powered off when the main switch 317 is set to the right side.

The flash unit 318 is configured as a pop-up built-in flash. In a case where an external flash unit or the like is attached to the camera body 10, the connection terminal part 319 is used for connection.

The eyecup 321 is a U-shaped shielding part that inhibits external light from entering the finder window 316.

The exposure correction button 323 is used to manually adjust exposure values (aperture value and shutter speed). The AE lock button 324 is used to keep exposure fixed.

The setting buttons 312 are used to perform operations relating to various functions of the imaging device 1. The setting buttons include, for example, a menu button for displaying a menu screen on the LCD 311, a menu switching button for switching the content of the menu screen, and so forth.

The direction selecting key 314 has a circular-shaped part having a plurality of pressing parts (parts indicated by triangular marks in the figure) arranged circumferentially at regular intervals. The direction selecting key 314 is configured so that pressing operations of the pressing parts can be detected by contact points (switches) (not shown) provided in association with the individual pressing parts. The push button 315 is provided at the center of the direction selecting key 314. The direction selecting key 314 and the push button 315 are used to change the magnification factor for shooting (movement of the zoom lens 212 (see FIG. 5) in the wide-angle direction or the telephoto direction), perform frame forwarding of recorded pictures played on the LCD 311 or the like, and enter instructions for setting of shooting conditions (aperture value, shutter speed, whether to perform flashing, etc.) or the like.

The display changeover switch 85 is implemented by a two-point slide switch. When the contact point of the display changeover switch 85 is set to an "optical" position on the upper side, an optical finder mode (also referred to as an "OVM mode") is selected, and an image of a subject is displayed in the field of view of the optical finder. Thus, the user can perform a composition determining operation (also referred to as "framing") by visually checking the image of the subject displayed in the field of view of the optical finder through the finder window 316.

On the other hand, when the contact point of the display changeover switch 85 is set to a "monitor" position on the lower side, an electronic finder mode (also referred to as an "EVF mode" or a "live view mode") is selected, and a live view image of the image of the subject is displayed in a manner like a moving picture on the LCD 311. Thus, the user can perform framing by visually checking the live view image displayed on the LCD 311.

As described above, with the imaging device 1, it is possible to determine a composition of a subject by selecting either an electronic finder that performs live view display or an optical finder. The switching between the EVF mode and the OVF mode is performed by an operation of the display changeover switch 85 shown in FIG. 2 or in response to detection of an eye in the proximity of the finder window 316.

Internal Configuration of the Imaging Device 1

Figure 3:
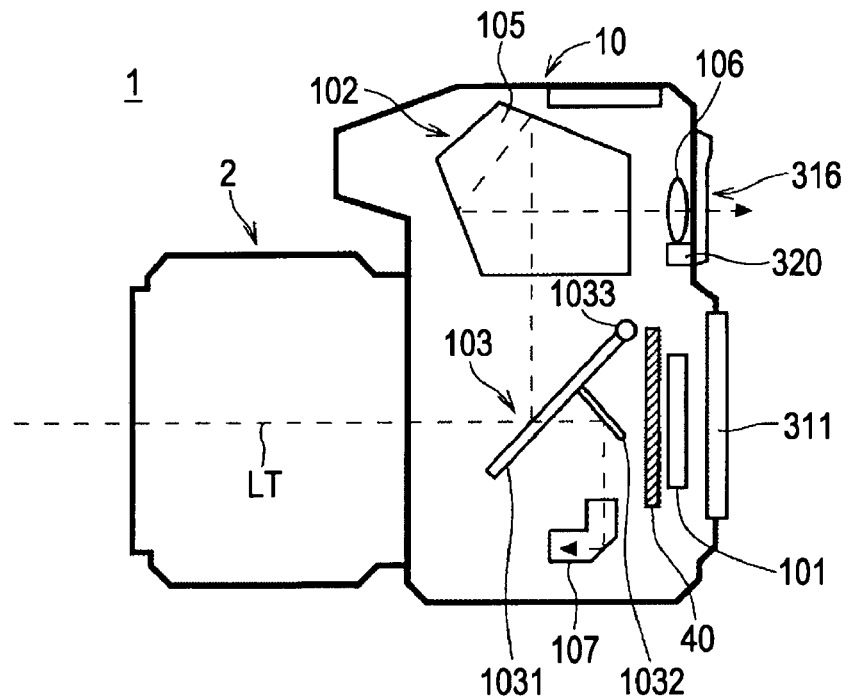
FIG. 3 is a vertical sectional view of the imaging device.
Figure 4:
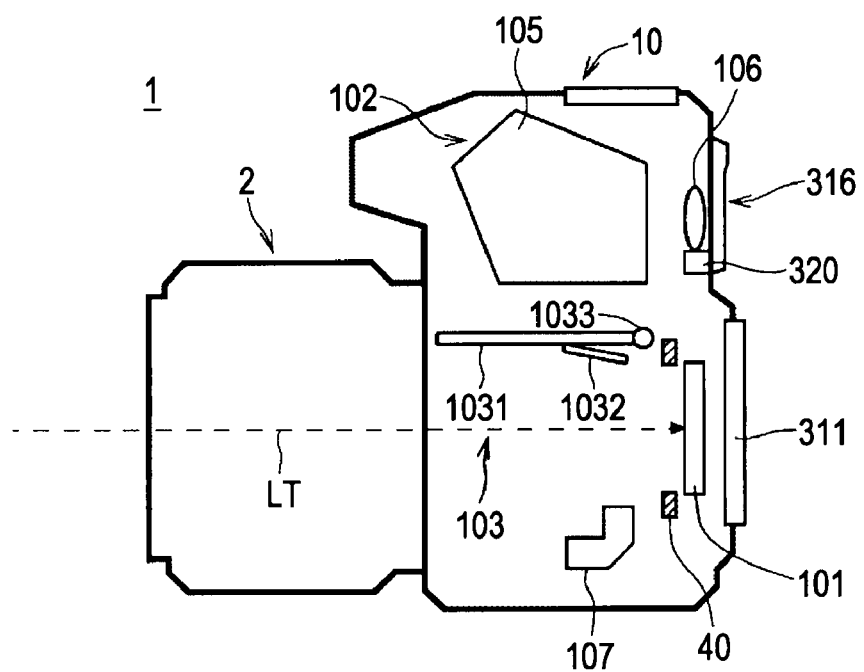
FIG. 4 is a vertical sectional view of the imaging device.

Next, the internal configuration of the imaging device 1 will be described. FIGS. 3 and 4 are vertical sectional views of the imaging device 1. As shown in FIG. 3, inside the camera body 10, an imaging element 101, a finder unit 102 (finder optical system), a mirror unit 103, a phase-difference AF module 107, and so forth are provided.

The imaging element 101 is disposed in a direction that is perpendicular to the optical axis LT of the lens set 21 of the exchange lens 2 when the exchange lens 2 is mounted on the camera body 10. As the imaging element 101, for example, a CMOS color area sensor (CMOS imaging element) with a two-dimensional matrix of pixels individually having photodiodes is used. The imaging element 101 generates analog electric signals (image signals) of individual color components of red (R), green (G), and blue (B) regarding an image of a subject, formed through the exchange lens 2, and outputs the analog electric signals as image signals of the individual R, G, and B color components.

On the optical axis LT, the mirror unit 103 is disposed at a position where the light from the subject is reflected toward the finder unit 102. The light from the subject coming through the exchange lens 2 is reflected upward by the mirror unit 103 (a main mirror 1031 described later), and part of the light from the subject transmits through the mirror unit 103.

The finder unit 102 includes a pentaprism 105, an eyeglass 106, and the finder window 316. The pentaprism 105 is a prism that has a pentagonal section and that inverts an image of a subject entering from a bottom face thereof in a top-to-bottom and left-to-right fashion by internal reflection to form an upright image. The eyeglass 106 guides the subject image inverted into an upright image by the pentaprism 105 to the outside of the finder window 316. With the configuration described above, the finder unit 102 functions as a finder for checking the field of view for shooting when the user is waiting before an actual shooting operation.

The mirror unit 103 includes a main mirror 1031 and a submirror 1032. On the rear side of the main mirror 1031, the submirror 1032 is provided so that the submirror 1032 can rotate so as to fall toward the rear surface of the main mirror 1031. The part of the light from the subject having transmitted through the main mirror 1031 is reflected by the submirror 1032, and the reflected light enters the phase-difference AF module 107.

The mirror unit 103 described above is configured as what is called a quick return mirror. For example, at the time of exposure (actual shooting), as shown in FIG. 4, the mirror unit 103 is rotated upward about a rotation axis 1033, so that the mirror unit is withdrawn from the optical path of the light from the subject (mirror-up state). At this time, when the mirror unit 103 is stopped at a position under the pentaprism 105, the submirror 1032 is withdrawn so that the submirror 1032 becomes substantially parallel to the main mirror 1031. Thus, the light from the subject coming through the exchange lens 2 reaches the imaging element 101 without being blocked by the mirror unit 103, whereby the imaging element 101 is exposed. Upon completion of an imaging operation by the imaging element 101, the mirror unit 103 is returned to the original position (the position shown in FIG. 3) to enter a mirror-down state.

Furthermore, by placing the mirror unit 103 in the mirror-up state prior to actual shooting (shooting for image recording), the imaging device 1 can perform live-view (preview) display to display an image of a subject on the LCD 311 in a manner like a moving picture on the basis of image signals sequentially generated by the imaging element 101.

The phase-difference AF module 107 is what is called an AF sensor implemented, for example, by a macrometer sensor that detects focus information of a subject. The phase-difference AF module 107 is disposed under the mirror unit 103. The phase-difference AF module 107 detects an in-focus position by phase-difference focus detection (hereinafter referred to as "phase-difference AF"). That is, when the user checks a subject through the finder window 316 while waiting for a shooting operation, light from the subject is guided to the phase-difference AF module 107 with the main mirror 1031 and the submirror 1032 moved down as shown in FIG. 3, and the focus lens 211 in the exchange lens 2 is driven for focus adjustment on the basis of an output from the phase-difference AF module 107.

In front of the imaging element 101 in the direction of the optical axis LT, a shutter unit 40 is provided. The shutter unit 40 includes a screen that moves up and down. The shutter unit 40 is configured as a mechanical focal plane shutter that opens or blocks the optical path of light coming from the subject and guided to the imaging element 101 along the optical axis LT. The shutter unit 40 can be omitted in a case where the imaging element 101 is an imaging element with a fully electronic shutter.

Electrical Configuration of the Imaging Device 1

FIG. 5 is a block diagram showing the electrical configuration of the imaging device 1. In FIG. 5, parts corresponding to those shown in FIGS. 1 to 4 are designated by the same numerals. For convenience of description, the electrical configuration of the exchange lens 2 will first be described.

The exchange lens 2 includes, in addition to the lens set 21 constituting the shooting optical system described above, a lens driving mechanism 24, a lens position detector 25, a lens controller 26, and a diaphragm driving mechanism 27.

In the lens set 21, the focus lens 211, the zoom lens 212, and a diaphragm 23 for adjusting the amount of light that reaches the imaging element 101 are arranged along the optical axis LT (FIG. 3) in a barrel so that an image of a subject is formed on the imaging element 101 by capturing light coming from a subject through the lens set 21. In AF control, an AF actuator 71M in the exchange lens 2 drives the focus lens 211 along the direction of the optical axis LT to adjust the focus.

A focus driving controller 71A generates a driving control signal used to move the focus lens 211 to an in-focus position, on the basis of an AF control signal supplied from a main controller 62 via the lens controller 26, and controls the AF actuator 71M by using the driving control signal. The AF actuator 71M is implemented by a stepping motor or the like. The AF actuator 71M applies a lens driving force to the lens driving mechanism 24.

The lens driving mechanism 24 is implemented, for example, by a helicoid and a gear (not shown) that rotates the helicoid. The lens driving mechanism 24 receives a driving force from the AF actuator 71M and drives the focus lens 211 and so forth in a direction parallel to the optical axis LT. The direction and amount of movement of the focus lens 211 correspond to the direction of rotation and the number of revolutions of the AF actuator 71M.

The lens position detector 25 includes, within the range of possible movement of the lens set 21, an encoding plate having a plurality of code patterns formed at a predetermined pitch along the direction of the optical axis LT, and an encoder brush that moves together with the lenses in sliding contact with the encoding plate. The lens position detector 25 detects the amount of movement for adjustment of the focus of the lens set 21. The lens position detected by the lens position detector 25 is output in the form of, for example, the number of pulses.

The lens controller 26 is implemented, for example, by a microcomputer including memories such as a ROM storing a control program and a flash memory storing data regarding status information.

Furthermore, the lens controller 26 has a communication function for performing communication with the main controller 62 of the camera body 10 via the connector Ec. Thus, the lens controller 26 can send to the main controller 62, for example, status information data regarding the lens set 21, such as the focal length, aperture value, in-focus distance, and amount of ambient light, and position information of the focus lens 211 detected by the lens position detector 25. Furthermore, the lens controller 26 can receive from the main controller 62, for example, data of the amount of driving of the focus lens 211.

The diaphragm driving mechanism 27 receives a driving force from a diaphragm driving actuator 76M via the coupler 75 and changes the aperture diameter of the diaphragm 23.

Next, the electrical configuration of the camera body 10 will be described. In addition to the imaging element 101, the shutter unit 40, and so forth described earlier, the camera body 10 includes an analog front end (AFE) 5, an image processor 61, an image memory 614, a main controller 62, a flash circuit 63, an operating unit 64, a VRAM 65, a card I/F 66, a memory card 67, a communication I/F 68, a power supply circuit 69, a battery 69B, a mirror driving controller 72A, a shutter driving controller 73A, and a diaphragm driving controller 76A.

As described earlier, the imaging element 101 is implemented by a CMOS color area sensor. The start and end of an exposure of the imaging element 101, and imaging operations such as selection for output from the individual pixels of the imaging element 101 and reading of pixel signals are controlled by a timing control circuit 51, which will be described later.

The AFE 5 has a function of supplying timing pulses to the imaging element 101 so that the imaging element 101 performs predetermined operations. Furthermore, the AFE 5 has a function of performing predetermined signal processing on image signals output from the imaging element 101, converting the image signals into digital signals, and outputting the digital signals to the image processor 61. The AFE 5 includes a timing control circuit 51, a signal processor 52, an A/D converter 53, and so forth.

The timing control circuit 51 generates predetermined timing pulses (pulses for generating vertical scanning pulses, horizontal scanning pulses, a reset signal, and so forth) on the basis of a reference clock signal output from the main controller 62, and outputs the timing pulses to the imaging element 101 to control imaging operations by the imaging element 101. Furthermore, the timing control circuit 51 controls the operations of the signal processor 52 and the A/D converter 53 by outputting predetermined timing pulses individually to the signal processor 52 and the A/D converter 53.

The signal processor 52 performs predetermined analog signal processing on analog image signals output from the imaging element 101. The signal processor 52 includes a correlated double sampling (CDS) circuit, an automatic gain control (AGC) circuit, a clamp circuit, and so forth. The A/D converter 53 converts analog R, G, and B image signals output from the signal processor 52 into digital image signals composed of a plurality of bits (e.g., 12 bits) on the basis of timing pulses output from the timing control circuit 51.

The image processor 61 creates an image file by performing predetermined signal processing on image data output from the AFE 5. The image processor 61 includes a black-level correction circuit 611, a white balance control circuit 612, a gamma correction circuit 613, and so forth. Image data input to the image processor 61 is temporarily written to the image memory 614 in synchronization with reading from the imaging element 101. Then, the image data written to the image memory 614 is accessed when processing is executed in the individual blocks of the image processor 61.

The black-level correction circuit 611 corrects the black level of the R, G, and B digital image signals obtained through A/D conversion by the A/D converter 53 to a reference black level.

The white-balance control circuit 612 performs level conversion (white balance (WB) adjustment) of digital signals of the red (R), green (G), and blue (B) color components on the basis of a reference of white in accordance with a light source. More specifically, on the basis of WB adjustment data supplied from the main controller 62, the white-balance control circuit 612 identifies a portion estimated as corresponding to a white region of a subject according to luminance or chrominance data and so forth, obtains individual averages of the R, G, and B components and a G/R ratio and a G/B ratio of the portion, and performs level correction using these ratios as R and B correction gains.

The gamma correction circuit 613 corrects tone characteristics of image data that has undergone the white balance adjustment. More specifically, the gamma correction circuit 613 performs non-linear conversion and offset adjustment of the levels of the individual color components of image data using gamma correction tables prepared in advance.

The image memory 614, when in the shooting mode, temporarily stores image data output from the image processor 61, and is used as a work area for the main controller 62 to execute predetermined processing on the image data. When in the reproducing mode, the image memory 614 temporarily stores image data read from the memory card 67.

The main controller 62 is implemented, for example, by a microcomputer including memories such as a ROM that stores a control program and a RAM that temporarily stores data. The main controller 62 controls the operations of the individual parts of the imaging device 1.

The flash circuit 63, in a flash shooting mode, controls the amount of light emitted by the flash unit 318 or an external flash unit connected to the connection terminal part 319 to an amount set by the main controller 62.

The operating unit 64 includes the mode setting dial 305, the control-value setting dial 306, the shutter button 307, the setting buttons 312, the direction selecting key 314, the push button 315, the main switch 317, and so forth described earlier. The operating unit 64 is used to input operation information to the main controller 62.

The VRAM 65 has a capacity for storing image signals corresponding to the number of pixels of the LCD 311. The VRAM 65 is a buffer memory provided between the main controller 62 and the LCD 311. The card I/F 66 is an interface that enables exchange of signals between the memory card 67 and the main controller 62. The memory card 67 is a recording medium for saving image data generated by the main controller 62. The communication I/F 68 is an interface that enables transmission of image data and the like to a personal computer or other external devices.

The power supply circuit 69 is implemented, for example, by a constant voltage circuit or the like. The power supply circuit 69 generates voltages for driving the entire imaging device 1, such as the main controller 62, the imaging element 101, and various driving units. The application of electricity to the imaging element 101 is controlled according to a control signal supplied from the main controller 62 to the power supply circuit 69. The battery 69B is a primary battery such as an alkaline battery or a secondary battery such as a nickel metal hydride battery. The battery 69B is a power source that supplies electric power to the entire imaging device 1.

The mirror driving controller 72A generates a driving signal for driving the mirror driving actuator 72M in synchronization with timing of a shooting operation. The mirror driving actuator 72M is an actuator that rotates the mirror unit 103 (quick return mirror) to a horizontal position or a tilted position.

The shutter driving controller 73A generates a driving control signal for the shutter driving actuator 73M on the basis of a control signal supplied from the main controller 62. The shutter driving actuator 73M is an actuator that performs driving for opening and closing the shutter unit 40.

The diaphragm driving controller 76A generates a driving control signal for the diaphragm driving actuator 76M on the basis of a control signal supplied from the main controller 62. The diaphragm driving actuator 76M applies a driving force to the diaphragm driving mechanism 27 via the coupler 75.

Operation of the Imaging Device 1

Figure 6:
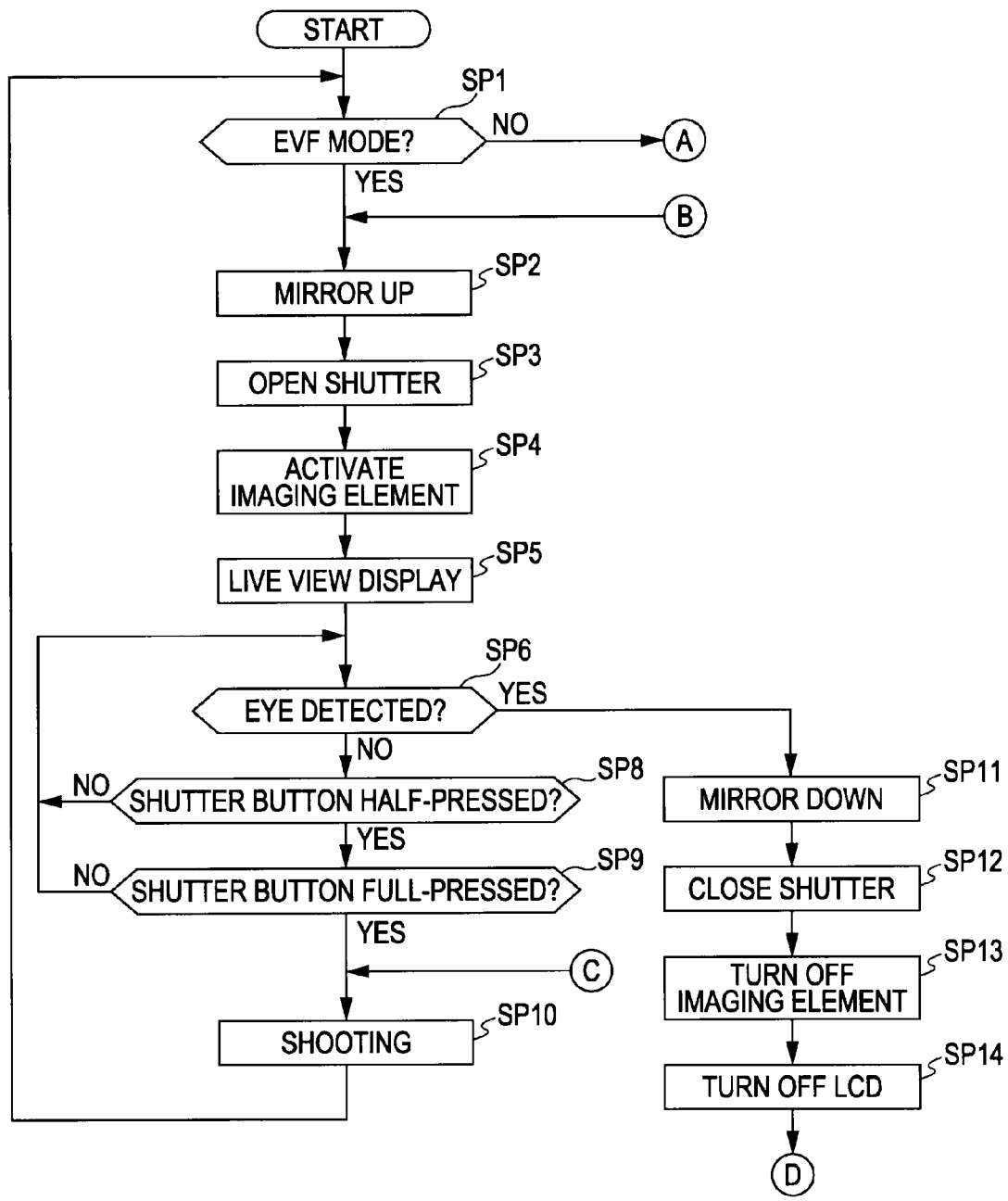
FIG. 6 is a flowchart of a shooting operation by the imaging device.
Figure 7:
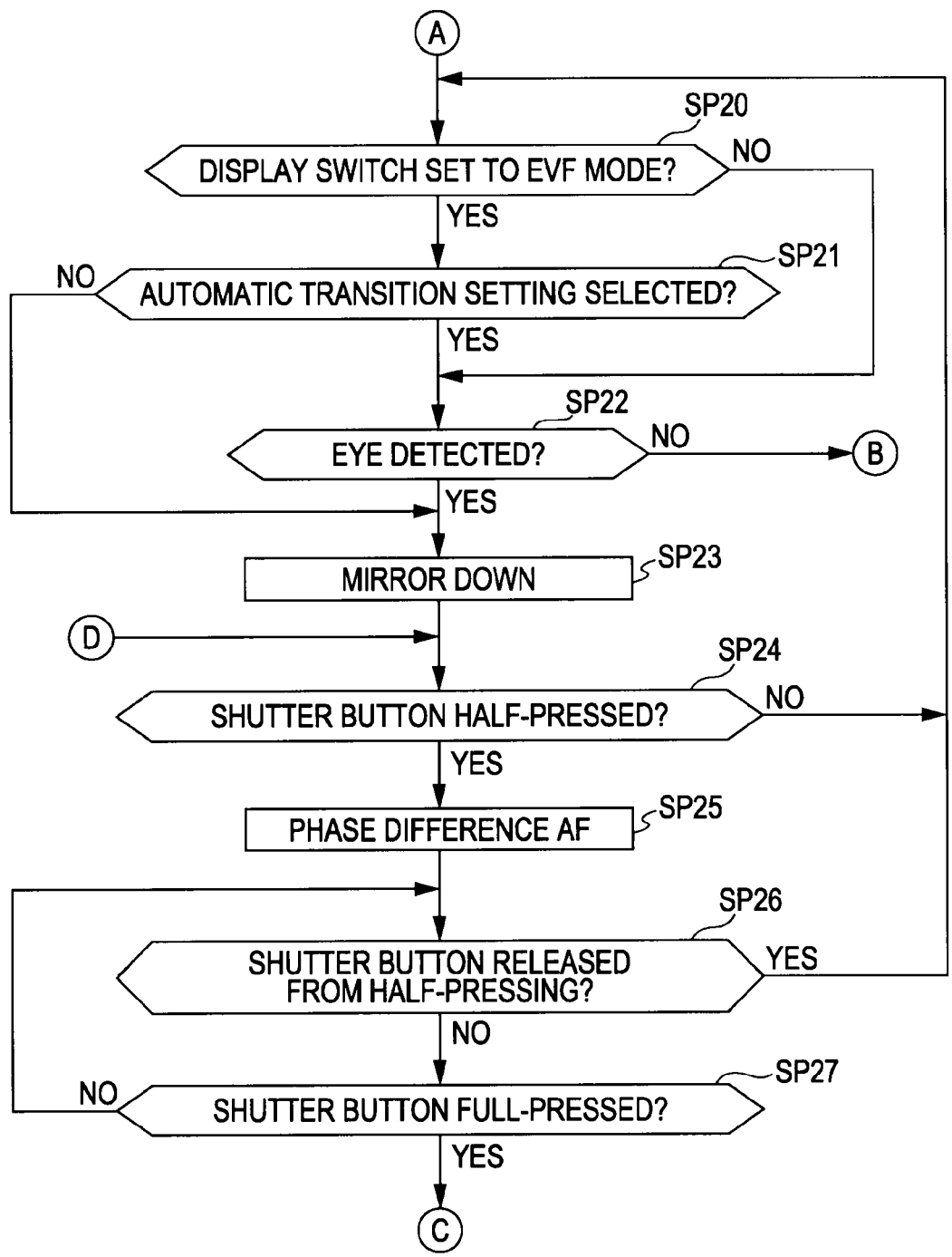
FIG. 7 is a flowchart of a shooting operation by the imaging device.

Next, an operation of the imaging device 1 will be described. FIGS. 6 and 7 are flowcharts of a shooting operation of the imaging device 1.

When the shooting mode is selected by a dial operation using the mode setting dial 305 of the imaging device 1, the shooting operation shown in FIGS. 6 and 7 is executed.

Referring to FIG. 6, first, in step SP1, it is determined whether the EVF mode is selected by an operation of the display changeover switch 85 or detection of an eye in the proximity of the finder window 316. If it is determined that the EVF mode is not selected, the operation proceeds to step SP20 (FIG. 7), in which a composition determining operation can be performed in the OVF mode. Step SP20 and the subsequent steps will be described later.

On the other hand, if it is determined that the EVF mode is selected, the operation proceeds to step SP2, in which a composition determining operation can be performed in the EVF mode.

More specifically, in step SP2, the mirror unit 103 is driven so that the mirror unit 103 is withdrawn from the optical path of light coming from the subject through the exchange lens 2.

In step SP3, the shutter unit 40 is opened. In step SP4, the imaging element 101 is activated so that the imaging element 101 is ready to generate image signals by exposure.

In step SP5, supply of electric power to the LCD 311 is started, and a live view display on the LCD 311 is started on the basis of image signals successively generated by the imaging element 101.

In step SP6, it is determined whether the optical finder is being used for the composition determining operation. More specifically, it is determined whether an eye is detected by the eye detecting sensor 320 in the proximity of the finder window 316. If an eye is detected, the operation proceeds to step SP11, and the mode is changed from the EVF mode to the OVF mode (mode transition). This will be described later in detail.

On the other hand, if an eye is not detected, the operation proceeds to step SP8.

In step SP8, it is detected whether the shutter button 307 is half-pressed. If it is detected that the shutter button 307 is not half-pressed, the operation returns to step SP6, and processing in step SP6 is executed again. On the other hand, if it is detected that the shutter button 307 is half-pressed, the operation proceeds to step SP9.

In step SP9, it is detected whether the shutter button 307 is full-pressed. If it is detected that the shutter button 307 is not full-pressed, the operation proceeds to step SP6, and the processing in step SP6 is executed again. On the other hand, if it is detected that the shutter button 307 is full-pressed, the operation proceeds to step SP10.

In step SP10, shooting (exposure) is performed. More specifically, exposure by the imaging element 101 is started in the mirror-up state, in which light from a subject reaches the imaging element 101. Then, predetermined image processing is performed on image signals acquired by the imaging element 101, and the result is recorded on the memory card 67 or the like.

Upon completion of step SP10, the operation returns to step SP1, and the processing in step SP1 is executed again.

Next, a process executed in a case where it is determined in step SP6 (FIG. 6) that an eye is detected in the proximity of the finder window 316 will be described.

In this case, the operation proceeds to step SP11, and a mode transition to the OVF mode occurs.

More specifically, in step SP11, the mirror unit 103 is driven so that the mirror unit 103 is disposed on the optical path of light from the subject.

In the subsequent step SP12, the shutter unit 40 is closed, and in step SP13, the imaging element 101 is deactivated. Then, in step SP14, the LCD 311 is turned off. Then, the operation proceeds to step SP24.

After the transition to step SP24, when the eye is no longer detected in the proximity, the operation proceeds to step SP2 (SP 22), and a mode transition from the OVF mode to the EVF mode occurs (described later).

As described above, upon detection of an eye in the proximity in the EVF mode, a mode transition from the EVF mode to the OVF mode occurs. When the eye is no longer detected in the proximity, the mode returns to the EVF mode.

Next, a case will be described where it is determined that the EVF mode is not selected (the OVF mode is selected) in step SP1 by an operation of the display changeover switch 85 or detection of an eye in the proximity of the finder window 316 so that the operation proceeds to step SP20 (FIG. 7).

In this case, first, in step SP20, the position of the contact point of the display changeover switch 85 is detected. More specifically, it is determined whether the display changeover switch 85 is set to the OVF mode. If the display changeover switch 85 is set to the OVF mode (the position of the contact point is "optical"), the operation proceeds to step SP21. If the display changeover switch 85 is set to the EVF mode (the position of the contact point is "monitor"), the operation proceeds to step SP22.

In step SP21, it is determining whether setting for causing transition from the OVF mode to the EVF mode when an eye is not detected in the proximity (also referred to as "automatic transition setting") is selected (enabled). If the automatic transition setting is selected, the operation proceeds to step SP22. If the automatic transition setting is not selected, the operation proceeds to step SP23.

The automatic transition setting can also be expressed as non-transition setting, in which transition from the OVF mode to the EVF mode is not executed automatically when an eye is not detected in the proximity.

Figure 8:
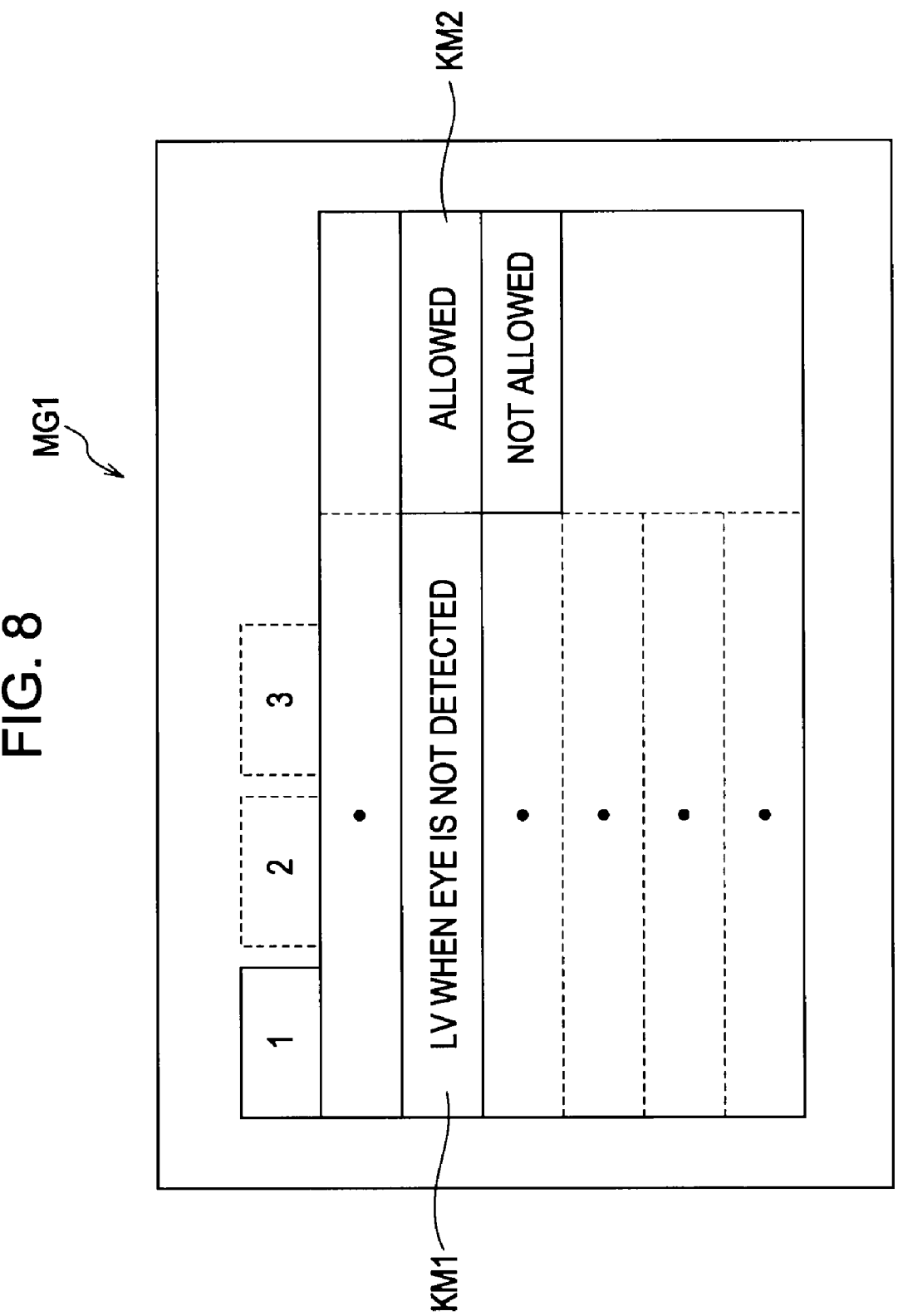
FIG. 8 is an illustration showing an example of a menu screen.

The automatic transition setting can be enabled by using a menu screen MG1 shown in FIG. 8. More specifically, the automatic transition setting can be enabled on the menu screen MG1 by operating the direction selecting key 314 or the like to select "LV when eye is not detected" KM1 as setting and further selecting "Allowed" KM2.

In step SP22, similarly to step SP6 described earlier, it is determined whether an eye is detected in the proximity. If an eye is not detected in the proximity, the operation proceeds to step SP2, and a mode transition from the OVF mode to the EVF mode occurs. On the other hand, if an eye is detected in the proximity, the operation proceeds to step SP23.

In step SP23, the mirror unit 103 is driven so that the mirror unit 103 is disposed on the optical path of light coming from the subject.

In the subsequent step SP24, similarly to step SP8 described earlier, it is detected whether the shutter button 307 is half-pressed. If it is detected that the shutter button 307 is not half-pressed, the operation returns to step SP20, and the processing in step SP20 is executed again. On the other hand, if it is detected that the shutter button 307 is half-pressed, the operation proceeds to step SP25.

In step SP25, focus adjustment (phase-difference AF control) by a phase-difference detection method is performed by using the phase-difference AF module 107.

In the subsequent step SP26, it is detected whether the shutter button 307 has been released from half-pressing. If it is detected that the shutter button 307 has been released from half-pressing, the operation returns to step SP20, and the processing in step SP20 is executed again. On the other hand, if it is detected that the shutter button 307 has not been released from half-pressing, the operation proceeds to step SP27.

In step SP27, similarly to step SP9 described earlier, it is detected whether the shutter button 307 is full-pressed. If it is detected that the shutter button 307 is not full-pressed, the operation proceeds to step SP26, and the processing in step SP26 is executed again. On the other hand, if it is detected that the shutter button 307 is full-pressed, the operation proceeds to step SP10 described earlier, in which shooting is performed.

As described above, when an eye is not detected in the proximity is not detected in the OVF mode, basically, a mode transition from the OVF mode to the EVF mode occurs. Then, when an eye is detected in the proximity, the mode returns to the OVF mode. However, when the automatic transition setting is not enabled with the display changeover switch set to the OVF mode, a mode transition does not occur even when an eye is detected in the proximity, and the OVF mode is maintained.

As described above, the imaging device 1 includes optical-path switching means for performing switching between a first optical path through which light coming from a subject is guided to the finder window 316 and a second optical path through which the light from the subject is guided to the imaging element 101, and an eye detecting sensor 320 that detects presence of an eye in a proximity of the finder window 316. If an eye is detected in the proximity by the eye detecting sensor 320, a first control operation is executed to select the first optical path so that the light coming from the subject is guided to the finder window 316. On the other hand, when an eye is not detected in the proximity by the eye detecting sensor 320, a second control operation is executed to select the second optical path so that a preview display is performed. Accordingly, it becomes possible to readily perform switching between an electronic finder and an optical finder in accordance with whether an eye is detected in the proximity. Furthermore, it is possible to alleviate laboriousness of manual operations performed by using the display changeover switch 85.

Furthermore, in the imaging device 1, the switching between the electronic finder and the optical finder is performed in accordance with whether or not the presence of an eye is detected in the proximity, without any operation performed by using an operation member provided on the imaging device 1. Accordingly, since switching between the EVF mode and the OVF mode (mode transition) can be performed quickly, it becomes possible to perform a desired composition determining operation and to shoot a picture without missing a right timing for shooting.

Furthermore, the imaging device 1 includes setting means for setting whether to enable non-transition setting (non-execution mode), in which the second control operation is not executed automatically. When the non-transition setting is enabled, even when the presence of an eye in the proximity is not detected by the eye detecting sensor 320, the first control operation is executed. Accordingly, the user can select whether to perform switching between the electronic finder and the optical finder in accordance with whether the presence of an eye in the proximity is detected.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging device comprising:
   imaging means for generating image signals comprising an image of a subject in accordance with light coming from the subject through a shooting optical system;
   display means;
   electronic finder means for displaying, on the display means, a preview of the subject based on image signals successively generated by the imaging means before shooting;
   optical finder means having a finder window;
   optical-path switching means for switching between a first optical path, through which the light coming from the subject is guided to the finder window, and a second optical path, through which the light coming from the subject is guided to the imaging means;
   eye detecting means for detecting presence of an eye in a proximity of the finder window;
   first control means for performing a first control operation so that the optical-path switching means selects the first optical path to guide the light coming from the subject to the finder window when the eye detecting means detects the presence of an eye in the proximity of the finder window; and
   second control means for performing a second control operation so that the optical-path switching means selects the second optical path to display the preview of the subject on the display means when the eye detecting means does not detect the presence of an eye in the proximity of the finder window.

2. An imaging device comprising:
   imaging means for generating image signals comprising an image of a subject in accordance with light coming from the subject through a shooting optical system;

display means;

electronic finder means for displaying, on the display means, a preview of the subject based on image signals successively generated by the imaging means before shooting;

optical finder means having a finder window;

optical-path switching means for switching between a first optical path, through which the light coming from the subject is guided to the finder window, and a second optical path, through which the light coming from the subject is guided to the imaging means;

eye detecting means for detecting presence of an eye in a proximity of the finder window;

first control means for performing a first control operation so that the optical-path switching means selects the first optical path to guide the light coming from the subject to the finder window when the eye detecting means detects the presence of an eye in the proximity of the finder window;

second control means for performing a second control operation so that the optical-path switching means selects the second optical path to display the preview of the subject on the display means when the eye detecting means does not detect the presence of an eye in the proximity of the finder window; and setting means for setting whether to enable a non-execution mode, in which the second control means does not automatically perform the second control operation when the eye detecting means does not detect the presence of an eye in the proximity of the finder window, wherein, in a state where the non-execution mode is enabled, the first control means performs the first control operation when the eye detecting means does not detect the presence of an eye in the proximity of the finder window.

3. An imaging device comprising:

an imaging unit configured to generate image signals comprising an image of a subject in accordance with light coming from a subject through a shooting optical system;

a display unit;

an electronic finder unit configured to display, on the display unit, a preview of the subject based on image signals successively generated by the imaging unit before actual shooting;

an optical finder unit having a finder window;

an optical-path switching unit configured to switch between a first optical path, through which the light coming from the subject is guided to the finder window, and a second optical path, through which the light coming from the subject is guided to the imaging unit;

an eye detecting unit configured to detect presence of an eye in a proximity of the finder window;

a first control unit configured to perform a first control operation so that the optical-path switching unit selects the first optical path to guide the light coming from the subject to the finder window when the eye detecting unit detects the presence of an eye in the proximity of the finder window; and a second control unit configured to perform a second control operation so that the optical-path switching unit selects the second optical path to display a preview of the subject on the display unit when the eye detecting unit detects the presence of an eye in the proximity of the finder window.

4. The imaging device according to claim 3, further comprising:

a display changeover switch configured to slide between a first position and a second position, wherein, the first control unit performs the first control operation when a user slides the display changeover switch into the first position, and the second control unit performs the second control operation when the user slides the display changeover switch into the second position.

5. The imaging device according to claim 3, wherein the imaging unit comprises a mirror unit that rotates to withdraw from the second optical path when the presence of an eye in the proximity of the finder window is not detected and rotates to be disposed in the second optical path when the presence of an eye in the proximity of the finder window is detected.

6. An imaging device comprising:

an imaging unit configured to generate image signals comprising an image of a subject in accordance with light coming from a subject through a shooting optical system;

a display unit;

an electronic finder unit configured to display, on the display unit, a preview of the subject based on image signals successively generated by the imaging unit before actual shooting;

an optical finder unit having a finder window;

an optical-path switching unit configured to switch between a first optical path, through which the light coming from the subject is guided to the finder window, and a second optical path, through which the light coming from the subject is guided to the imaging unit;

an eye detecting unit configured to detect presence of an eye in a proximity of the finder window;

a first control unit configured to perform a first control operation so that the optical-path switching unit selects the first optical path to guide the light coming from the subject to the finder window when the eye detecting unit detects the presence of an eye in the proximity of the finder window;

a second control unit configured to perform a second control operation so that the optical-path switching unit selects the second optical path to display a preview of the subject on the display unit when the eye detecting unit detects the presence of an eye in the proximity of the finder window; and a setting unit configured to set whether to enable a non-execution mode, in which the second control unit does not automatically perform the second control operation when the eye detecting unit does not detect the presence of an eye in the proximity of the finder window, wherein, in a state where the non-execution mode is enabled, the first control unit performs the first control operation when the eye detecting unit does not detect the presence of an eye in the proximity of the finder window.

* * * * *